(12) United States Patent
Matlack et al.

(10) Patent No.: US 8,210,778 B2
(45) Date of Patent: Jul. 3, 2012

(54) METHOD AND DEVICE FOR CLAMPING AND MACHINING

(75) Inventors: Mike P. Matlack, St. Charles, MO (US); Kurt A. Burton, Wildwood, MO (US)

(73) Assignee: The Boeing Comapny, Irvine, CA (US)

( * ) Notice: Subject to any disclaimer, the term of this patent is extended or adjusted under 35 U.S.C. 154(b) by 1048 days.

(21) Appl. No.: 11/769,985

(22) Filed: Jun. 28, 2007

(65) Prior Publication Data

US 2008/0112768 A1    May 15, 2008

Related U.S. Application Data

(60) Provisional application No. 60/849,669, filed on Oct. 5, 2006.

(51) Int. Cl.
*B23B 35/00* (2006.01)
*B23B 49/02* (2006.01)

(52) U.S. Cl. ........... 408/1 R; 408/97; 408/115 R

(58) Field of Classification Search .......... 408/1 R, 408/84, 95, 97, 98, 103, 115 R
See application file for complete search history.

(56) References Cited

U.S. PATENT DOCUMENTS

| | | | | |
|---|---|---|---|---|
| 1,612,205 A * | 12/1926 | Muth | ........ | 408/72 B |
| 1,617,554 A * | 2/1927 | Swartz | ........ | 408/241 R |
| 2,335,614 A * | 11/1943 | Spievak | ........ | 408/84 |
| 2,339,324 A * | 1/1944 | Fischer | ........ | 408/56 |
| 2,461,716 A * | 2/1949 | Blatt | ........ | 408/112 |
| 2,669,889 A * | 2/1954 | Adolf | ........ | 408/22 |
| 2,795,978 A * | 6/1957 | Kinsey | ........ | 408/67 |
| 2,950,638 A * | 8/1960 | Wier | ........ | 408/84 |
| 2,975,661 A * | 3/1961 | Coleman | ........ | 408/113 |
| 3,015,240 A * | 1/1962 | Hodnett | ........ | 408/84 |
| 3,761,104 A * | 9/1973 | Kubicek | ........ | 279/19.7 |
| 3,874,808 A * | 4/1975 | Zaccardelli et al. | ........ | 408/1 R |
| 4,265,057 A * | 5/1981 | Hoffman | ........ | 451/389 |
| 4,605,344 A * | 8/1986 | Hartmann | ........ | 408/95 |
| 4,749,314 A * | 6/1988 | LeBlond | ........ | 408/68 |
| 4,802,798 A * | 2/1989 | Adamson | ........ | 408/112 |
| 5,024,562 A * | 6/1991 | Arai et al. | ........ | 408/1 R |
| 5,947,654 A * | 9/1999 | Blankenship et al. | ........ | 408/72 B |
| 5,961,257 A * | 10/1999 | Bettini et al. | ........ | 408/97 |
| 6,514,018 B2 * | 2/2003 | Martinez et al. | ........ | 408/14 |
| 2006/0102699 A1 | 5/2006 | Burton et al. | | |
| 2006/0124691 A1 | 6/2006 | Wood et al. | | |
| 2006/0163316 A1 | 7/2006 | Burton et al. | | |
| 2007/0034671 A1 | 2/2007 | Burton et al. | | |
| 2007/0152015 A1 | 7/2007 | Burton et al. | | |

* cited by examiner

*Primary Examiner* — Daniel Howell
(74) *Attorney, Agent, or Firm* — Hanley, Flight & Zimmerman, LLC

(57) ABSTRACT

A tool-in-tool device driven by a single power spindle performs multiple operations on a workpiece. The device includes a first tool holder for holding a tool such as a drill, and a second tool holder surrounding mounted on the first tool holder. The second tool holder may hold a second tool such as clamp for clamping the drill to the workpiece, a guide bushing for guiding the drill and a chip breaker for breaking workpiece chips generated by a drilling operation. Multiple interchangeable bushings allow matching the bushing to the size of the drill.

23 Claims, 8 Drawing Sheets

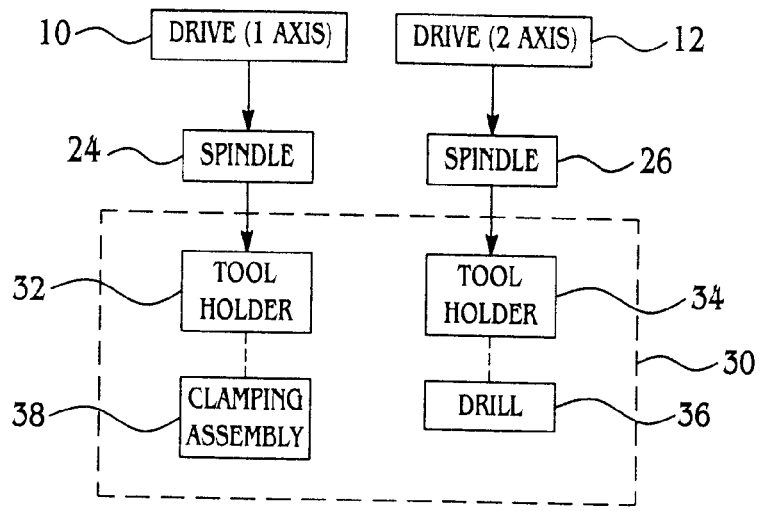
FIG. 1
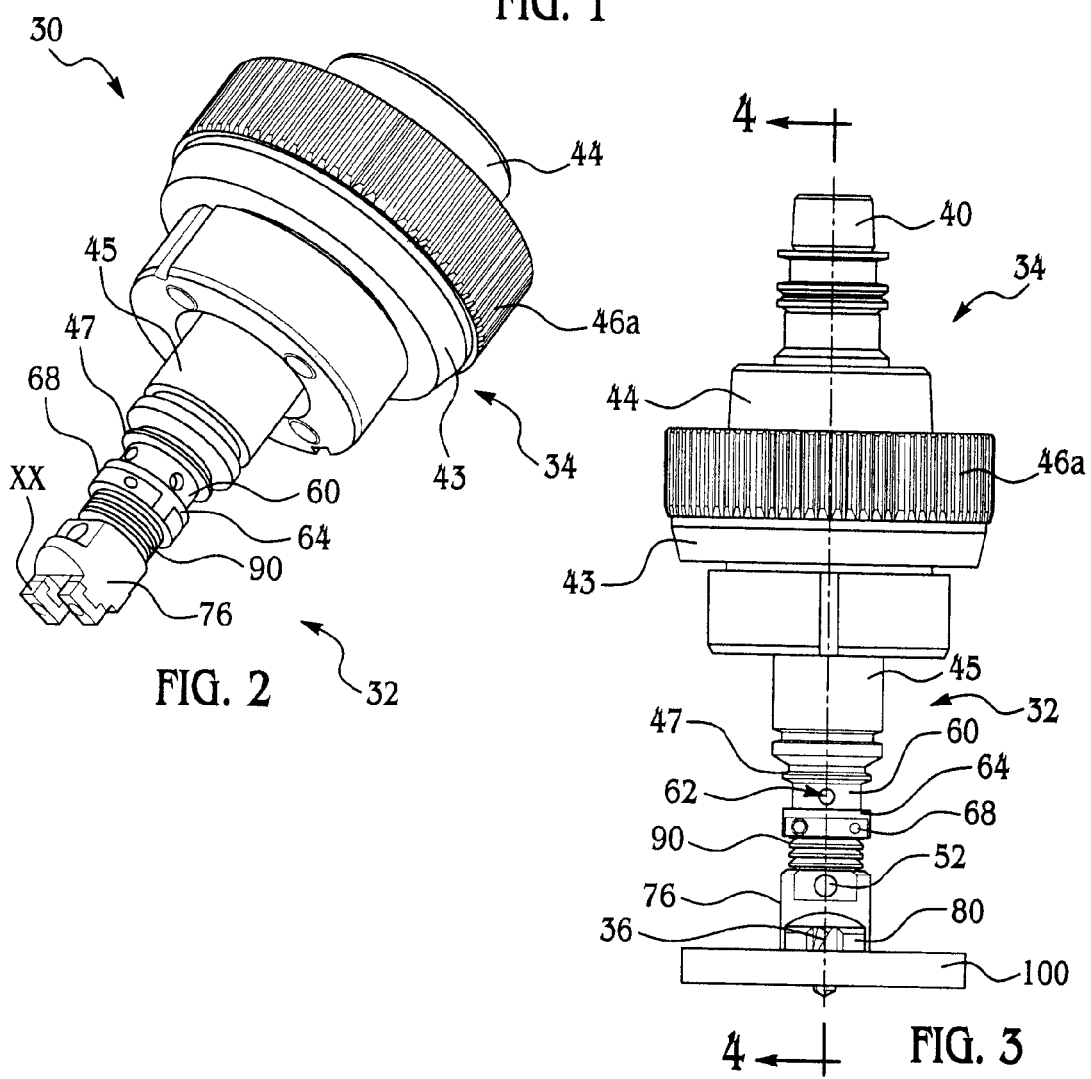
FIG. 2
FIG. 3

METHOD AND DEVICE FOR CLAMPING AND MACHINING

CROSS REFERENCE TO RELATED APPLICATIONS

This application claims the benefit of Provisional U.S. Patent Application No. 60/849,669 filed Oct. 5, 2006 incorporated by reference in its entirety herein.

TECHNICAL FIELD

This disclosure generally relates to machining operations, and deals more particularly with a device and related method for performing clamping and machining operations on a workpiece using a coaxial spindle assembly.

BACKGROUND

A variety of tool holders are available for holding interchangeable tools used to perform machining operations on workpieces. In some cases, it may be necessary to perform multiple operations simultaneously, using more than one tool, such as clamping and drilling a workpiece. The desired drill is normally loaded into a tool holder which is driven by a rotating spindle, such as those found on multi-axis machining centers, and a separate clamping mechanism is used to clamp the drill to the workpiece and/or to clamp the workpiece to an underlying structure. Some clamping mechanisms may include portions that are required to be positioned between the tool holder and the workpiece, thus requiring a longer drill to reach the workpiece. However, drilling accuracy may suffer when using longer drills because of possible drill run-out and the reduced ability to maintain concentricity of the drill bit relative to target hole locations on the workpiece.

Accordingly, there is a need for a device and a related method that allows both clamping and machining of a workpiece that overcomes the problems discussed above. Embodiments of the disclosure are intended to satisfy this need.

SUMMARY

The disclosed embodiments provide a tool-in-tool device that allows multiple operations to be performed on a workpiece, such as clamping and drilling, using a coaxial spindle assembly. The spindle assembly includes a pair of tool holders coaxial arranged to perform coordinated clamping and drilling operations. In addition to a clamping assembly, one of the tool holders includes a guide bushing that both guides the drill to improve hole accuracy, and breaks up workpiece chips as they are created by the drilling operation. The bushing is replaceable with any of multiple, interchangeable bushings sized to match the drill or other tool used for a particular application.

According to one disclosed embodiment, a device for clamping and machining a workpiece device is provided comprising: a clamp for applying a clamping force to the workpiece; a first tool holder adapted to be coupled with a first drive spindle for holding the clamp; a tool passing through the first tool holder for performing machining operations on the workpiece; and a second tool holder adapted to be coupled with a second drive spindle for holding the tool. The first tool holder may include a bushing which guides a shaft of the first tool during a machining operation. The bushing may include a chip breaker for breaking workpiece chips generated by the machining operation. The bushing may be slideably mounted on the first workpiece holder and may be coupled with a spring for biasing a foot on the bushing to apply a clamping force to the workpiece.

According to another disclosed embodiment, a tool-in-tool device is provided for performing operations on a workpiece. The device comprises: a first tool for performing a first operation on the workpiece; a second tool for performing a second operation on the workpiece; a first tool holder for holding the first tool; and, a second tool holder for holding the second tool. The second tool passes through and is guided by the first tool holder. The first tool may include a clamp for clamping the device against the workpiece, and the second tool may include a drill for drilling a hole in the workpiece. The clamp may further include a foot for engaging the workpiece, a slide assembly slideably mounting the foot on the second tool holder, and a spring for biasing the foot against the workpiece.

According to a disclosed method embodiment, drilling a workpiece comprises the steps of: installing a drill in a first tool holder; installing a clamp in a second tool holder; coaxially feeding the first and second tool holders toward the workpiece; clamping the workpiece with the clamp; and, drilling the workpiece after the workpiece has been clamped. The step of feeding the tool holders may include: attaching the first and second tool holders to first and second coaxial spindles, respectively, and linearly displacing first and second coaxial spindles toward the workpiece. The method may further comprise the steps of biasing the clamp against the workpiece after the clamp engages the workpiece, and displacing the drill relative to the clamp after the clamp has engaged the workpiece.

The disclosed apparatus was developed with the Tool in tool concept in mind. A standard drill is clamped into the small (second) tool holder and a compliant spring loaded bushed clamp device is clamped into the first tool holder. The device is maneuvered to the surface of a part and overdriven by the machine controller in order push against and allow the spring device to engage and comply to the part surface. This clamp up is to hold the skin tightly against the substructure. The skin is held in place allowing for the drill pass. By tight clamping of the skin to the substructure, chips from the process, cannot migrate in between the skin and substructure. The drill is advanced through the part eliminating burrs between the two prices.

When drilling with the disclosed FSW system, the small tool holder is utilized in the Tool in Tool Concept which is the second tool. Because of the physical characteristics of the spindle, the second tool requires a longer drill bit which resides in the high speed section of the spindle. (100 to 8000 rpm) The shoulder tool or first tool can only attain a speed of 2000 rpm which may be inefficient for drilling aluminum. This system uses the force control of the machine and the clamp mechanism residing on the first tool to clamp the two work pieces (skin and structure) together.

The disclosed embodiment is a tool in tool based drill clamp concept that uses both holding fixtures in the coaxial FSW spindle design to secure skin to structure while concurrently drilling that structure in a one pass operation. The coaxial spindle design integrates the technological advances of the FSW machine and the force control loop to engage the skin with the structure clamp (first tool), assuring proper clamp pressure, before the drill pass (second tool). The force produced by the clamping device reduces the amount of chips that could otherwise migrate between the skin and the structure and the constant clamp-up pressure from the bushed clamp should improve concentricity.

The disclosed embodiment is a tool in tool based drill clamp that uses both holding fixtures in the coaxial FSW spindle design to secure skin to structure while concurrently drilling that structure in a one pass operation. The coaxial spindle integrates the technological advances of the FSW machine and the force control loop to engage the skin with the structure clamp (first tool), assuring proper clamp pressure, before the drill pass (second tool).

The disclosed apparatus utilizes the FSW machine coaxial spindle and the force control feature of the FSW system along with the two piece drill clamp apparatus to clamp to structure, sense load and drill structure minimizing run-out and improving drilled hole concentricity.

The disclosed apparatus allows the use of coaxial spindle features and the force loop to, drill concentric holes with the two set-up as opposed to a drill pass with the higher speed spindle only. The interchangeable bushings in the first tool reduces the predicted run-out of the drill pass for any drill required. If the second tool was used by itself the run-out would be more significant because of the extended lengths of the drill bits and the exclusion of the bushing feature.

Other features, benefits and advantages of the disclosed embodiments will become apparent from the following description of embodiments, when viewed in accordance with the attached drawings and appended claims.

BRIEF DESCRIPTION OF THE ILLUSTRATIONS

FIG. 1 is a block diagram illustration of a tool-in-tool device for performing clamping and drilling operations on a workpiece.

FIG. 2 is a perspective illustration of the tool-in-tool device.

FIG. 3 is an elevational illustration of the device shown in FIG. 2, during a drilling operation on a workpiece.

DETAILED DESCRIPTION

Figures 4, 5:
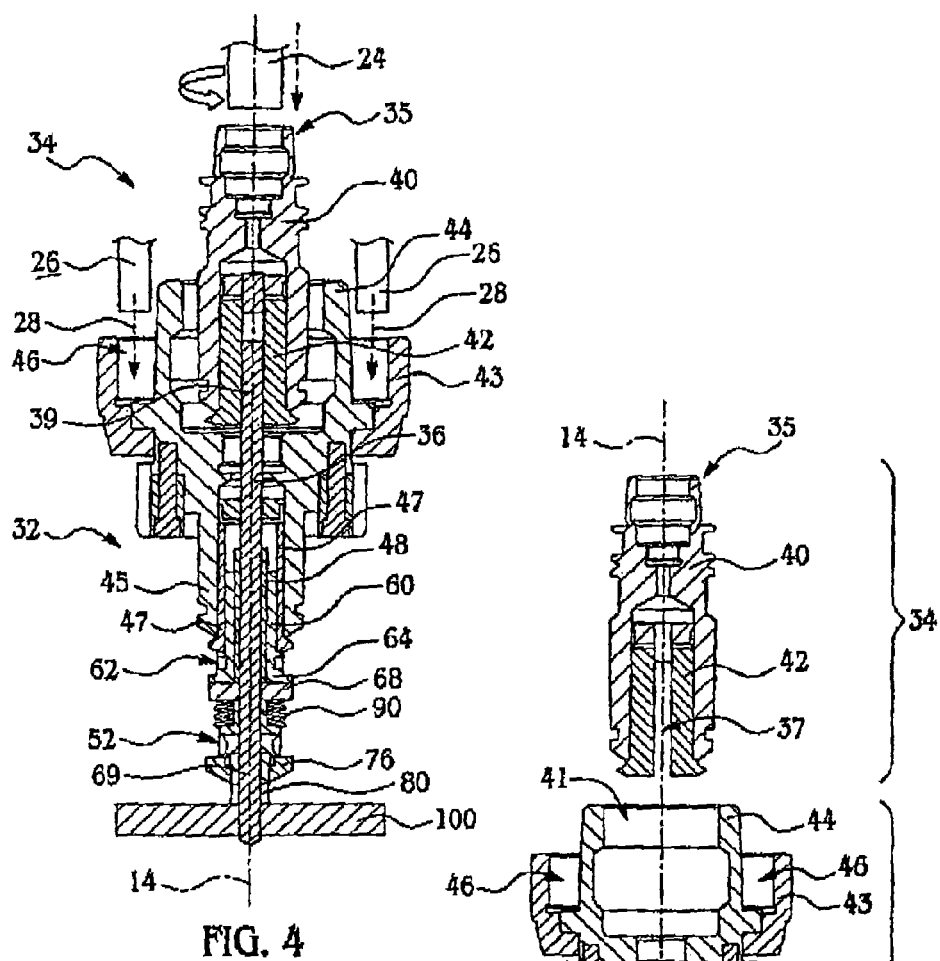
FIG. 4 is a sectional illustration taken along the line 4-4 in FIG. 3.
FIG. 5 is an exploded, sectional illustration of the tool holders and clamping assembly.

Referring first to FIG. 1, a tool-in-tool clamping and drilling device 30 is powered by a pair of drives 10, 12 through a pair of independent, coaxial spindles 24, 26. Drive 10 displaces the spindle 24 linearly along a central axis 14 (see FIGS. 4 and 5). The device 30 includes a first tool holder 32 which may hold any of various tools. In the illustrated example, tool holder 32 is adapted to hold a clamping assembly 38.

Drive 12 powers spindle 26 to move linearly along the central axis 14, and to rotate around axis 14. A second tool holder 34 is coupled with the spindle 26, and may hold any of various machine tools for performing machining operations. In the illustrated example, tool holder 34 holds a drill 36. The drive 12 both rotates and feeds the drill 36 to perform drilling operations. The drives 10, 12 may form part of a machining center (not shown) for example and may include electric, hydraulic or pneumatic motors. In one exemplary application, the clamping and drilling device 30 may be used on a friction stir welding (FSW) machine (not shown) to drill holes into skins or substructures (not shown) for alignment and probing purposes. In the FSW application, the clamping and drilling device 30 may clamp up to and drill flat or contoured surfaces.

Referring now to all of the Figures, the first and second tool holders 32, 34 respectively, may perform coordinated clamping and drilling operations on a workpiece 100. As will be discussed below in more detail, the tool holder 32 concentrically surrounds and is coaxial with tool holder 34. As best seen in FIGS. 4 and 5, tool holder 34 includes a generally cylindrical body 40 having an upper end 35 configured to be coupled with spindle 24. Tool holder 34 further includes a collet 42 having a central axial opening 37 for holding the shank 39 of a drill 36. The drill 36 extends downwardly through a guide bushing 69 which functions to guide and stabilize the drill 36 during a drilling operation.

Tool holder 32 broadly includes a body 44 having a lower, tube-like extension 45 for holding a tool such as a clamping assembly 38. The upper end of body 44 includes an opening 41 in which the lower portion of the tool holder 34 is disposed. A collar 43 is secured to the body 44 and defines a ring shaped receptacle 46 for receiving a ring shaped, second spindle 26. The spindle 26 may be connected to the tool holder 32 by mating threads (not shown) between the second spindle 26 and the inside face of the collar 43. The outer surface of the collar 43 may include splines 46a that form part of a connection between the spindle 26 and the collar 43. The second spindle 26 displaces tool holder 32 linearly, in the direction of the arrows 28, toward and away from the workpiece 100, independent of the movement of second tool holder 34.

Tool holder 32 includes a collet 47 held within the tubular extension 45 of the body 46. A cylindrical sleeve 60 is held in the collet 47 and slideably receives the upper end of a cylindrical slide tube 48. The slide tube 48 includes a pair of rectangular, opposing openings 54 that define upper and lower stops 56, 58, respectively. The lower end of the slide tube 48 includes a through-hole 52 which functions as an access port, as will be described in more detail below. The lower end of the slide tube 48 includes an area of increased wall thickness 50 which defines an outer circumferential shoulder 50a.

The sleeve 60 includes four circumferentially spaced openings 62 which allow a tool such as a spanner (not shown) to grip and twist the sleeve 60 in order to disassemble the clamping assembly 38. The sleeve 60 is provided with a circumferential shoulder 64 having a pair of downwardly depending ears 66. A pair of opposing, crescent shape members 68 are secured to the ears 66, as by screws (not shown). Each of the members 68 includes an inwardly facing projection 68a which extends through one of the rectangular openings 54 in the slide tube 48. The projections 68a function to engage the stops 56, 58 which limit the sliding movement of the slide tube 48 within the sleeve 60. A biasing device, such as, without limitation, a Belleville washer 90 is sleeved over the slide tube 48 and is trapped between members 68 and the shoulder 50a on the slide tube 48. The Belleville washer 90 biases the slide tube 48 to slide toward its extended position in which the projections 68a engage the upper stop 56 of the rectangular opening 54 in the slide tube 48.

Figure 6:
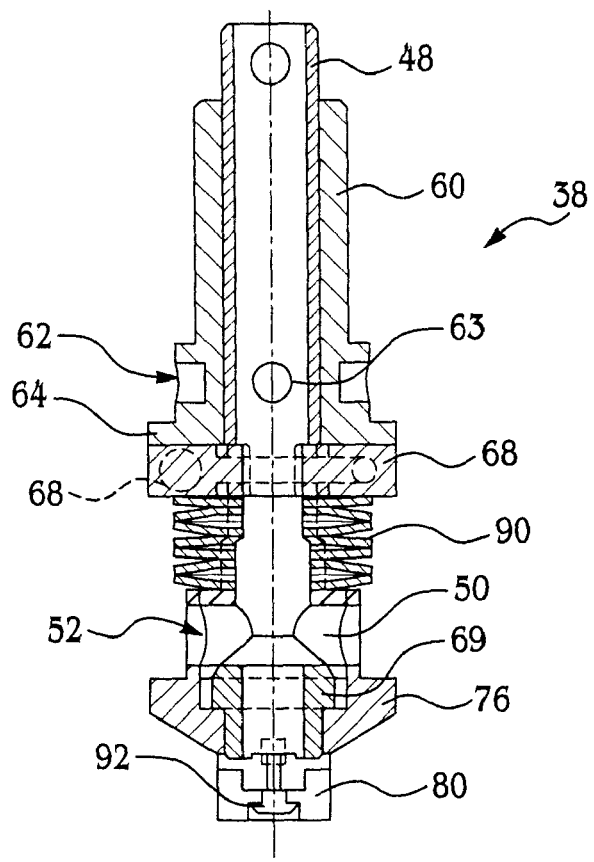
FIG. 6 is an enlarged sectional illustration of the clamping assembly.
Figure 7:
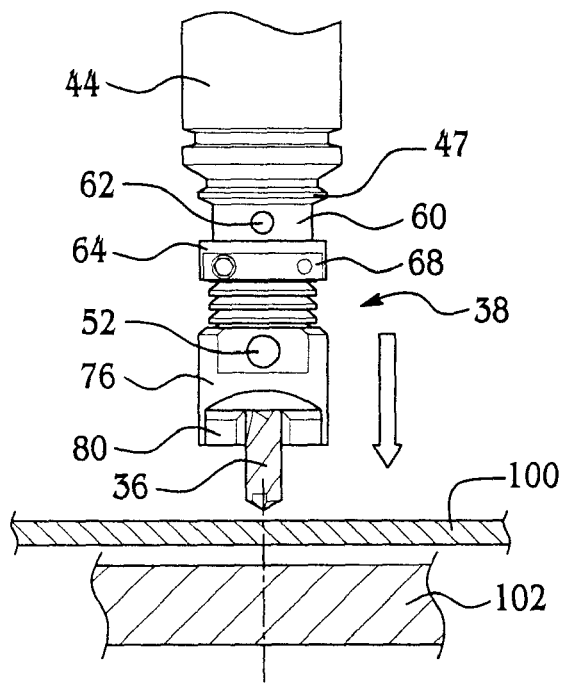
FIG. 7 is a side illustration of the lower portion of the device immediately before contacting a workpiece to be drilled.
Figure 8:
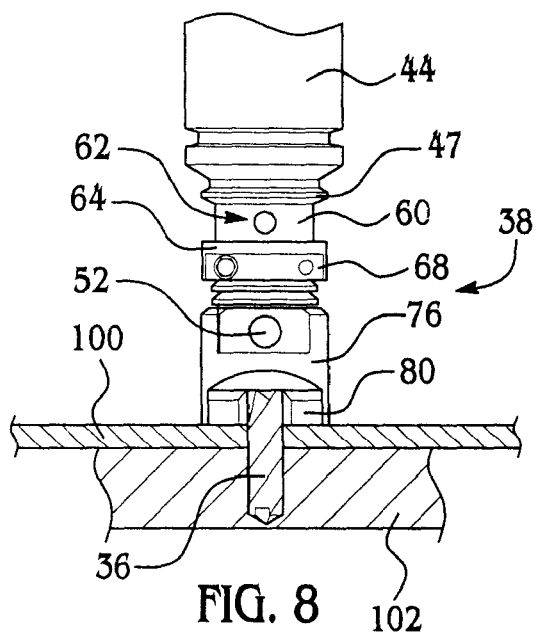
FIG. 8 is an illustration similar to FIG. 7 but showing the workpiece having been clamped and the drill having penetrated the workpiece.
Figure 9:
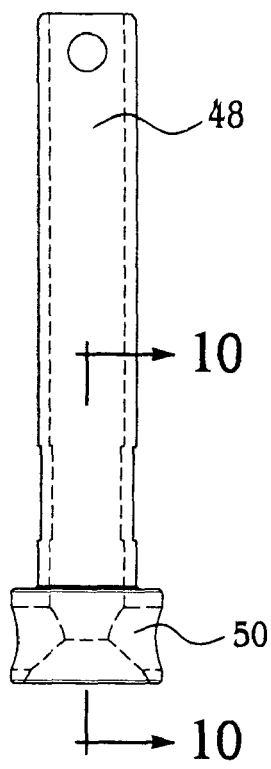
FIG. 9 illustrates in elevation, a slide tube forming part of the clamping assembly.
Figure 10:
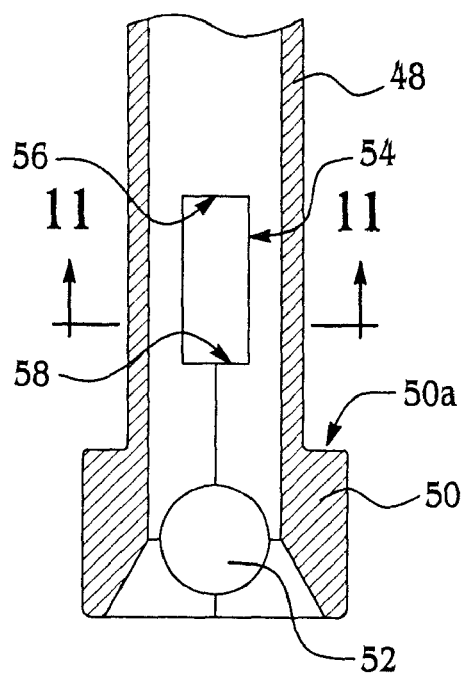
FIG. 10 is a sectional illustration taken along the line 10-10 in FIG. 9.
Figure 11:
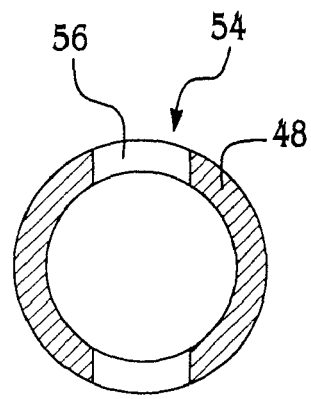
FIG. 11 is a sectional illustration taken along the line 11-11 in FIG. 10.
Figure 12:
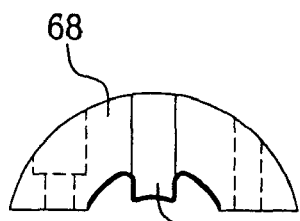
FIG. 12 is a plan illustration of a clamp member.
Figure 13:
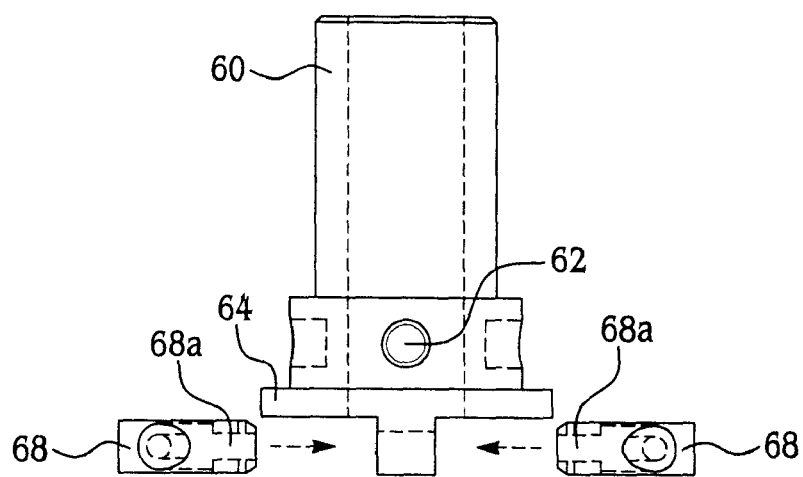
FIG. 13 illustrates one side of a tube body forming part of the clamping assembly, and the crescent shape members separated from the tube body.
Figure 13A:
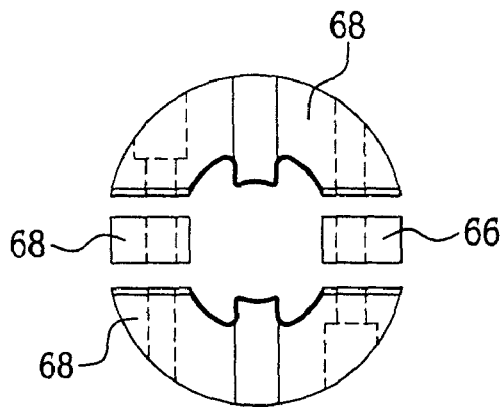
FIG. 13a is an exploded, bottom plan illustration showing how the crescent shaped members attach to the ears on the tube body.
Figure 14:
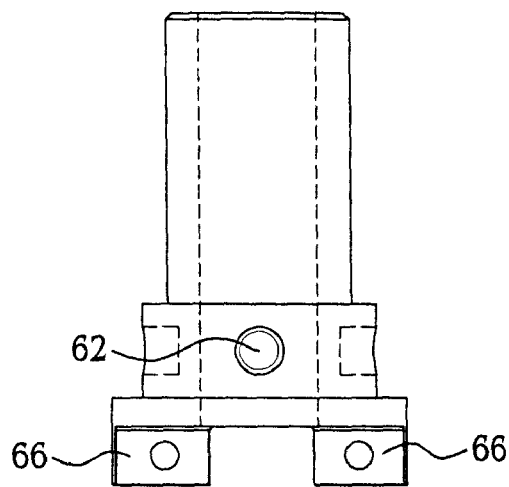
FIG. 14 illustrates another side of the tube body shown in FIG. 13.
Figure 15:
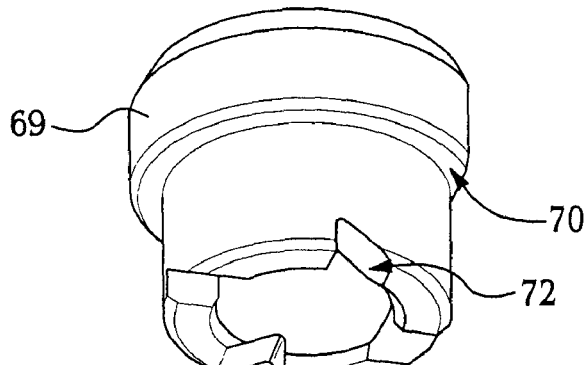
FIG. 15 is a perspective illustration of a guide bushing forming part of the clamping assembly.

A spacer body 76 is secured to the bottom of the slide tube 48 and includes a central opening 78 for receiving the bottom end of the guide bushing 69. A pair of workpiece engaging feet 80 are secured to the bottom of the spacer body by screws 92 (FIG. 6).

Figure 16:
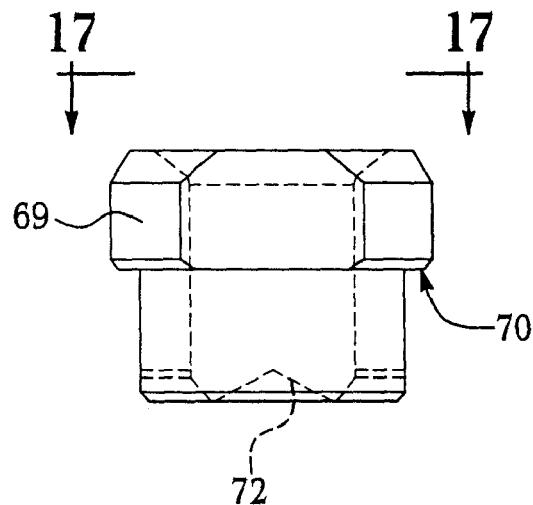
FIG. 16 illustrates one side of the guide bushing shown in FIG. 15.
Figure 17:
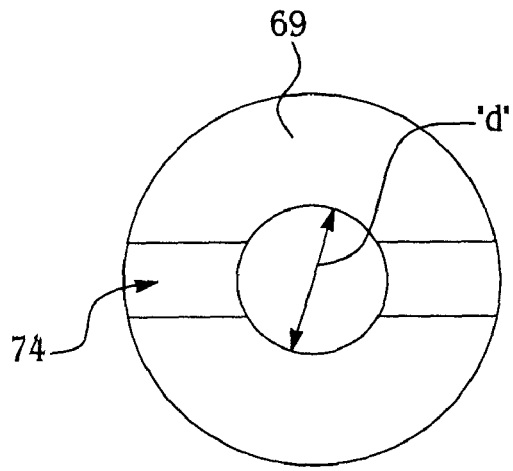
FIG. 17 is a plan illustration of the guide bushing shown in FIG. 16.
Figure 18:
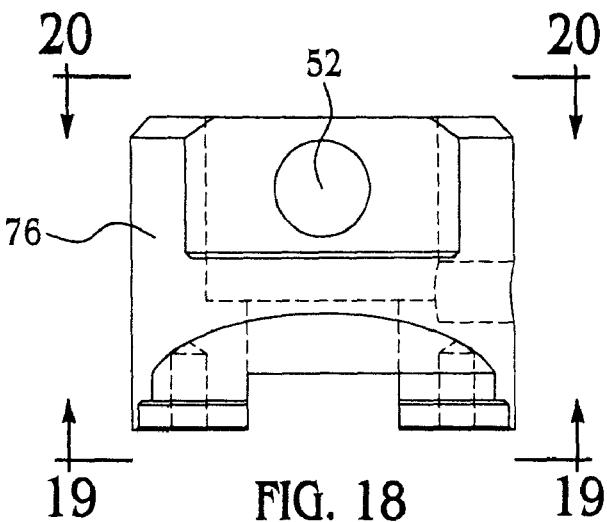
FIG. 18 illustrates one side of a spacer body.
Figure 19:
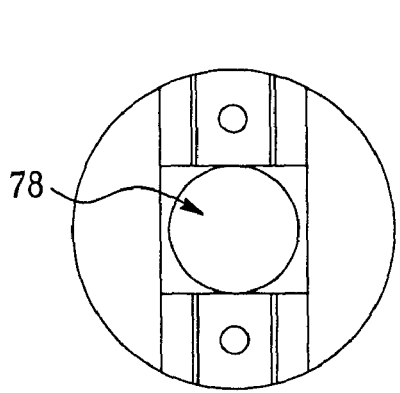
FIG. 19 illustrates the bottom of the spacer body shown in FIG. 18.
Figure 20:
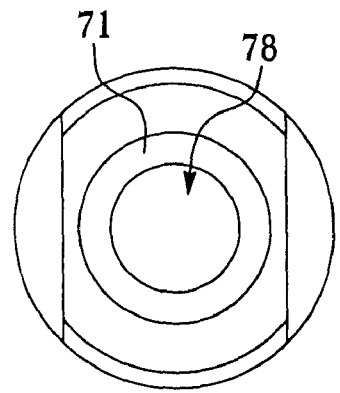
FIG. 20 illustrates the top of the spacer body shown in FIG. 18.
Figure 21:
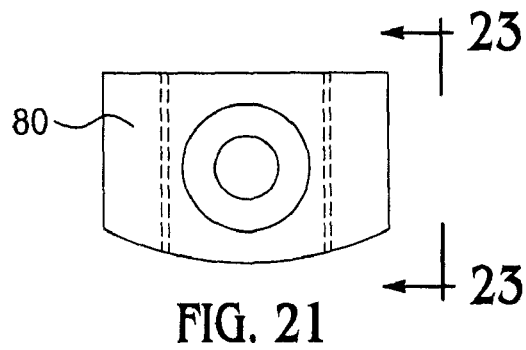
FIG. 21 illustrates the top of a clamping foot.
Figure 22:
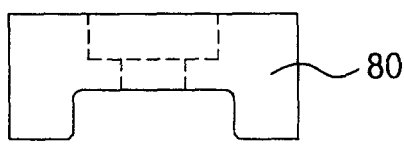
FIG. 22 illustrates one side of the clamping foot shown in FIG. 21.
Figure 23:
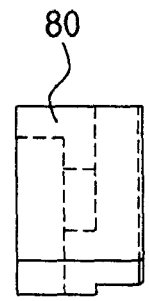
FIG. 23 illustrates one end of the clamping foot shown in FIG. 20.

As best seen in FIGS. 16-17, the guide bushing 69 has an interior diameter "d" closely matched to the diameter of the drill 36 so as to center the drill 36 and minimize run-out of the lower end of the drill 36. The guide bushing 69 includes a shoulder 70 that engages a ledge 71 on the spacer body 76. The bottom of the guide bushing 68 includes a plurality of circumferentially spaced, notch-like teeth 72 which function to break up accumulations of workpiece chips as they are generated by the drill 36.

In use, a drill 36 is placed in the collet 42 of tool holder 34, and a guide bushing 69 is installed in tool holder 32 that is sized to match the selected drill 36. The drill 36 is rotated by power supplied to the spindle 24 by drive 12. The guide bushing 68 guides the bottom end of the drill 36 so as to maintain its concentricity relative to a target location on the workpiece 100.

The movement and operation of the spindles 24, 26 are independent of each other however, they may be coordinated under computer control. Normally, spindle 26 moves toward the workpiece 100 while spindle 24 remains retracted. As spindle 26 feeds the tool holder 32 toward the workpiece 100, the foot 80 engages and presses against the workpiece 100. Continued linear displacement of the spindle 26 (and thus the tool holder 32) results in the foot 80 engaging the workpiece 100.

As the tool holder 32 continues to be displaced toward the workpiece 100, the washer 90 yields to the displacement force applied by the spindle 26, causing the slide tube 48 to slide within the sleeve 60 until the stop 56 is engaged by the projection 69 on member 68, or the spindle 26 reaches a programmed stopping point. The pressure applied by the foot 80, which is determined by the strength of the Belleville washer 90, clamps the workpiece 100 against a structural member 102 or similar backing plate. With the workpiece 100 securely clamped, spindle 24 then begins linearly displacing tool holder 34 toward the workpiece 100 until the drill 36 contacts the target location where a drill hole is to be formed. Continued displacement of the spinning spindle 24 causes the drill 36 to penetrate the workpiece 100, as the foot 80 continues to clamp and stabilize the workpiece 100 until the drilling operation is completed.

Workpiece chips (not shown) generated by the drilling operation move upwardly through the open interior of the spacer body 76 until they are engaged by the notch-like teeth 72 on the guide bushing 69. The teeth 72 function to break up accumulations of the chips as they are generated, which allows the chips to be carried away by an air or fluid stream so that they do not clog or interfere with the drilling operation. Due to the fact that the workpiece is tightly clamped between the foot 80 and the structural member 102, potential burrs around the drilled hole are reduced or eliminated, which might otherwise occur if workpiece 100 and structural member 102 are not tightly clamped together. Moreover, tight clamping of the workpiece 100 to the structural member 102 assures that workpiece chips and other cutting debris do not enter and become lodged between the workpiece 100 and the structural member 102.

In order to further facilitate chip removal during a drilling operation, fluid or air may be supplied to the drill 36 through the access port 52. Alternatively, a vacuum may be connected to the access port 52 in order to vacuum away cutting debris. The access port 52 also permits visually inspection of the drill 36 during a drilling operation.

After a hole has been drilled, spindle 24 is linearly retracted until the drill 36 disengages the workpiece 100. When the drill 36 has cleared the workpiece 100, spindle 26 then begins linearly retracting, causing tool holder 32 to move away from the workpiece 100. As the tool holder 32 moves away from the workpiece 100, the Belleville washer 90 continues to bias the foot 80 into engagement with the workpiece 100 to maintain clamping pressure until the clamping assembly 38 reaches the end of its travel where stop 58 is engaged.

In order to switch to a different size of the drill 36, the current drill 36 is released from the collet 42, and a spanner or other wrench (not shown) is inserted into the openings 62 in order to unscrew the clamping assembly 38 so that a guide bushing 69 matching the size of the new drill 36 can be installed.

Figure 24:
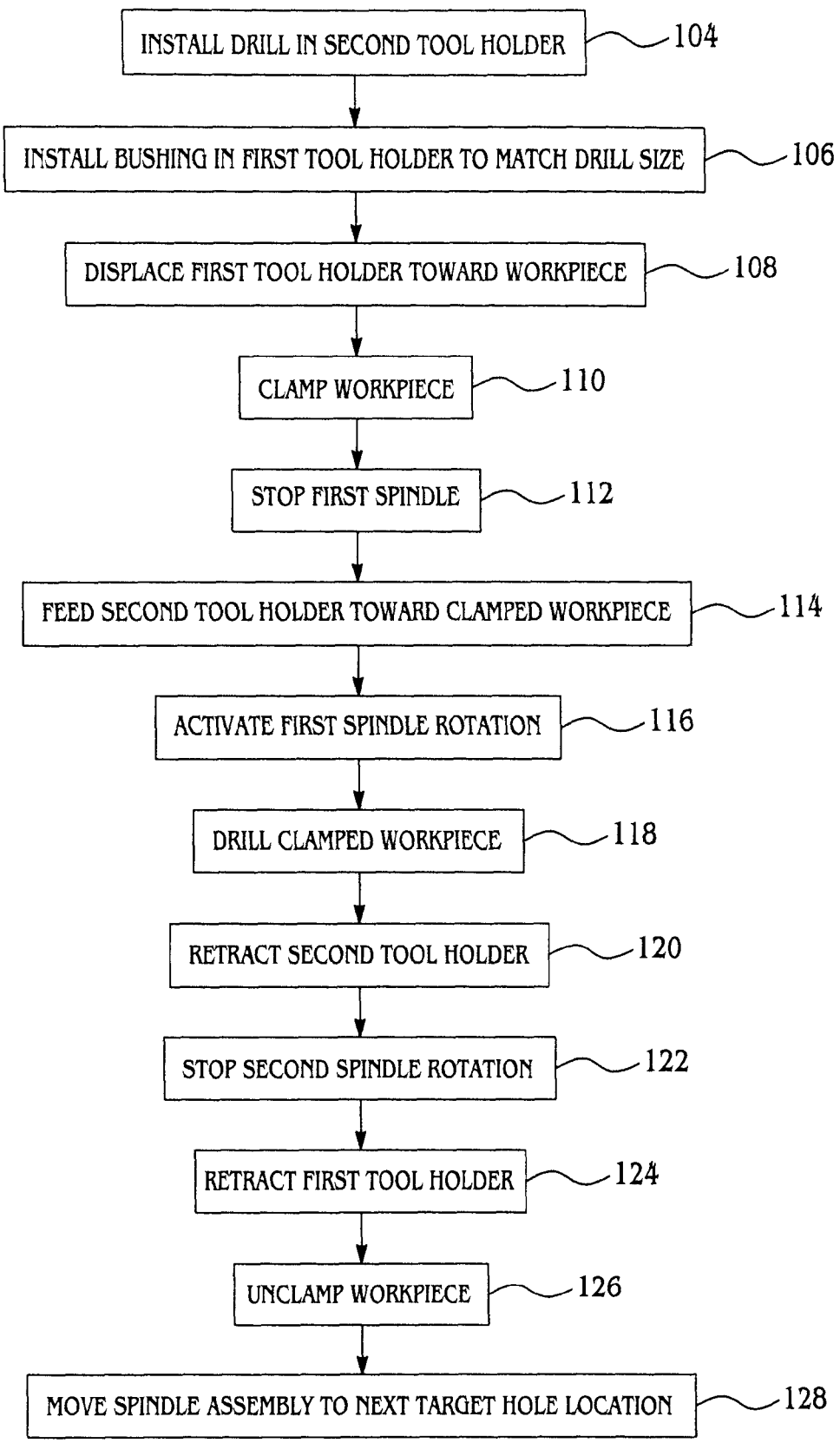
FIG. 24 is a block diagram illustration of a method for clamping and machining a workpiece according to a method embodiment of the disclosure.

Attention is now directed to FIG. 24, wherein the overall steps of a method embodiment are illustrated. Beginning at step 104, a drill 36 of the desired size is installed in the second tool holder 34. Next, at step 106, a bushing 69 is installed in the first tool holder 32 that has an internal diameter matching the size of the selected drill 36. Then, at step 108, the first tool holder 32 is displaced by the spindle 26 toward the workpiece 100, resulting in the workpiece 100 being securely clamped to a structural member 102, as shown at step 110. Movement of the first spindle 26 is stopped at step 112 when the workpiece 100 has been clamped.

With the workpiece 100 securely clamped, the second tool holder 34 is fed by spindle 24 toward the clamped workpiece 100, as shown at step 114. As the tool holder 34 is being advanced toward the workpiece 100, the spindle 24 is activated, causing the drill 36 to rotate. As the spindle 24 continues to displace the tool holder 34, the drill 36 is fed into the clamped workpiece 100 resulting in a hole being drilled at step 118.

When the hole has been fully drilled, spindle 24 begins linearly retracting, thereby moving the second tool holder 34 and drill 36 away from the workpiece 100. When the drill 36 has cleared the workpiece 100, rotation of spindle 24 may be terminated, as shown at step 122. As soon as the drill 36 has cleared the workpiece 100 during the retraction stroke, the first tool holder 32 may commence retraction at step 124, thereby unclamping the workpiece 100, as shown at step 126.

Finally, with a hole having been drilled in the workpiece 100 at the target location, spindles 24 and 26 can be moved along with their respective tool holders 32, 34 to the next target hole location.

Figure 25:
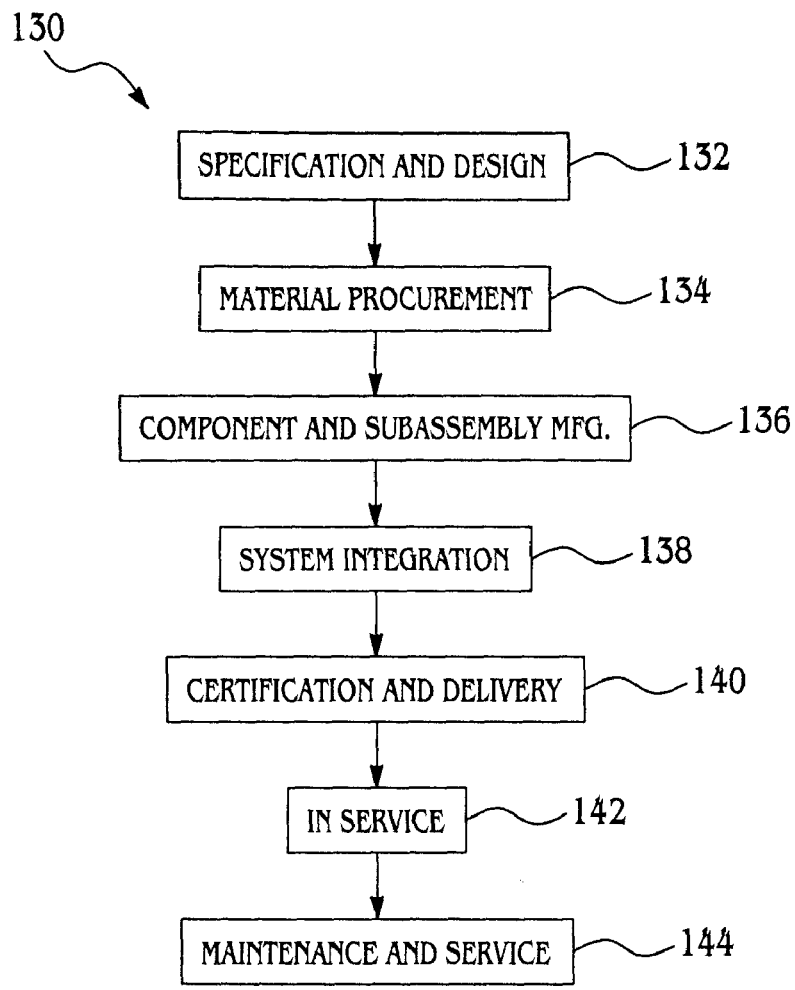
FIG. 25 is a flow diagram of an aircraft production and service methodology.
Figure 26:
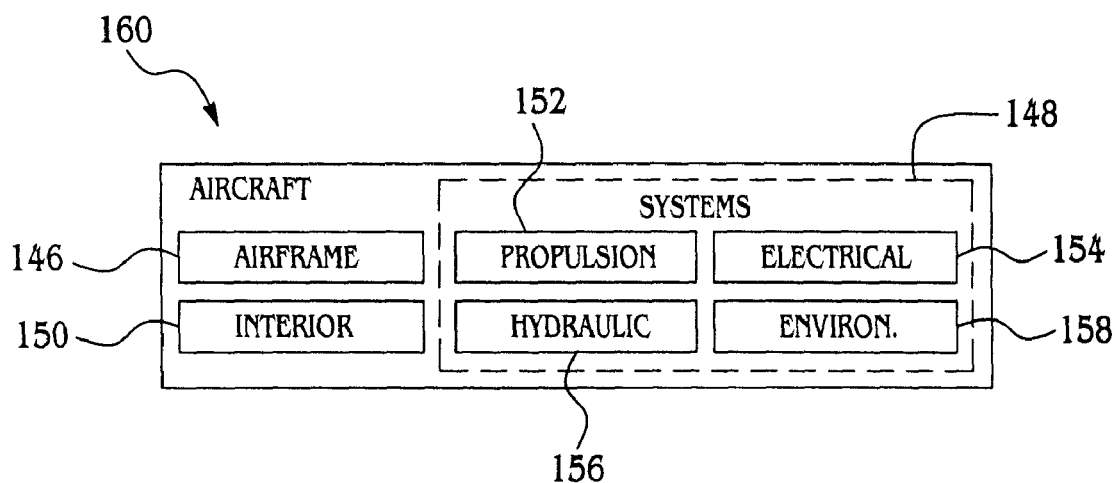
FIG. 26 is a block diagram of an aircraft.

The embodiments of the disclosure described above may be used in an aircraft manufacturing and service method 130 as shown in FIG. 25 and an aircraft 160 as shown in FIG. 26. During pre-production, exemplary method 130 may include specification and design 132 of the aircraft 160 and material procurement 134. During production, component and subassembly manufacturing 136 and system integration 138 of the aircraft 106 takes place. Thereafter, the aircraft 160 may go through certification and delivery 140 in order to be placed in service 142 While in service by a customer, the aircraft 160 is scheduled for routine maintenance and service 144 (which may include modification, reconfiguration, refurbishment, and so on).

Each of the processes of method 130 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 26, the aircraft 160 produced by exemplary method 130 may include an airframe 146 with a plurality of systems 148 and an interior 150. Examples of high-level systems 148 include one or more of a propulsion system 152, an electrical system 154, a hydraulic system 156, and an environmental system 158. Any number of other systems may be included. Although an aerospace example is shown, the principles of the invention may be applied to other industries, such as the automotive industry.

Apparatus and methods embodied herein may be employed during any one or more of the stages of the production and service method 130. For example, components or subassemblies corresponding to production process 136 may be fabricated or manufactured in a manner similar to components or subassemblies produced while the aircraft 160 is in service. Also, one or more apparatus embodiments, method embodiments, or a combination thereof may be utilized during the production stages 136 and 138, for example, by substantially expediting assembly of or reducing the cost of an aircraft 160. Similarly, one or more of apparatus embodiments, method embodiments, or a combination thereof may be utilized while the aircraft 160 is in service, for example and without limitation, to maintenance and service 144.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A device for clamping and machining a workpiece, comprising:
a clamp for applying a clamping force to the workpiece;
a first tool holder including a bushing adapted to be coupled with a first drive spindle for holding the clamp;
a tool having a shaft passing through and guided by said bushing of the first tool holder for performing machining operations on the workpiece; and
a second tool holder adapted to be coupled with a second drive spindle for holding the tool;
said first tool holder is coaxial with and surrounds said second tool holder, said first and second tool holder independently moveable toward and away from said workpiece.

2. The device of claim 1, wherein the tool is a drill.

3. The device of claim 2, wherein the first tool holder surrounds at least a portion of the second tool holder.

4. The device of claim 2, wherein the clamp includes a foot surrounding the drill for engaging the workpiece.

5. The device of claim 1, wherein the bushing includes a chip breaker.

6. The device of claim 1, wherein the clamp includes:
a foot for engaging the workpiece,
a slide assembly slideably mounting the foot on the first tool holder, and
biasing means for biasing the foot to slide toward and into engagement with the workplace.

7. The device of claim 6, wherein the biasing means includes a spring.

8. The device of claim 1, wherein the first and second tool holders are coaxial.

9. The device of claim 8, wherein the first tool holder includes a first collet for releasably holding the clamp.

10. The device of claim 1, further comprising a bushing held by the first tool holder for guiding the tool.

11. A tool-in-tool device for performing operations on a workpiece, comprising:
a first tool for performing a first operation on the workpiece; the first tool includes a clamp for clamping the device against the workpiece;
a second tool for performing a second operation on the workpiece; the second tool includes a drill;
a first tool holder for holding the first tool;
a foot for engaging the workpiece;
a slide assembly slideably mounting the foot on the first tool holder;
biasing means for biasing the foot against the workpiece;
a second tool holder for holding the second tool,
the second tool passes through and is guided by the first tool holder; and,
said first tool holder is coaxial with and surrounds said second tool holder, said first and second tool holder independently moveable toward and away from said workpiece.

12. The tool-in-tool device of claim 11, wherein the biasing means includes a spring.

13. The tool-in-tool device of claim 12, wherein the foot comprises an annular foot surrounding the drill.

14. The tool-in-tool device of claim 11, wherein:
the first tool includes a chip breaker, and
the second tool includes a drill for performing a drilling operation on the workpiece.

15. The tool-in-tool device of claim 11, wherein:
the first tool holder includes a first collet for releasably holding the first tool, and
the second tool holder includes a second collet for releasably holding the second tool.

16. The tool-in-tool device of claim 11, wherein:
the second tool includes a drill for performing a drilling operation on the workpiece, and
the first tool includes a guide bushing through which the drill is guided during the drilling operation.

17. The tool-in-tool device of claim 16, wherein the first tool includes a chip breaker for breaking workpiece chips generated by the drilling operation.

18. The tool-in-tool device of claim 17, wherein: the drill, the bushing and the chip breaker are coaxial.

19. The tool-in-tool device of claim 16, wherein;
the second tool holder includes a collet for releasably holding any of a plurality of sizes of drills, and
the guide bushing is releasably mounted on the first tool holder to allow installation of replacement bushings matching the size of the drill held by the collet.

20. A method of drilling a workpiece, comprising the steps of:
(A) installing a drill in a first tool holder having a bushing;
(B) installing a clamp in a second tool holder;
(C) feeding coaxially the first and second tool holders toward the workpiece by passing through and guiding a shaft of a tool by said bushing of the first tool holder;
(D) clamping the workpiece with the clamp; and,
(E) drilling the workpiece after the workpiece has been clamped in step (D);
said first and second tool holder are independently fed toward the workpiece in step (C) and retracted from workpiece following step (E).

21. The method of claim 20, wherein step (C) is performed by:
attaching the first and second tool holders to first and second drive spindles, respectively, and
linearly displacing first and second drive spindles toward the workpiece.

22. The method of claim 20, further comprising the step of:
(F) biasing the clamp against the workpiece after the clamp engages the workpiece.

23. The method of claim 22, further comprising the step of:
(G) displacing the drill relative to the clamp after the clamp has engaged the workpiece.

* * * * *